July 10, 1945.  A. V. WETHERBY-WILLIAMS  2,380,002
METHODS OF MAKING HEAT EXCHANGERS
Filed Dec. 31, 1942  2 Sheets-Sheet 1

INVENTOR.
ARTHUR VIVIAN WETHERBY-WILLIAMS
BY
*his* ATTORNEY

July 10, 1945.  A. V. WETHERBY-WILLIAMS  2,380,002
METHODS OF MAKING HEAT EXCHANGERS
Filed Dec. 31, 1942   2 Sheets-Sheet 2

INVENTOR.
BY ARTHUR VIVIAN WETHERBY-WILLIAMS
ATTORNEY

Patented July 10, 1945

2,380,002

UNITED STATES PATENT OFFICE 2,380,002

METHOD OF MAKING HEAT EXCHANGERS

Arthur Vivian Wetherby-Williams, New York, N. Y., assignor to Walker-Wallace, Incorporated, Buffalo, N. Y., a corporation of New York Application December 31, 1942, Serial No. 470,801

2 Claims. (Cl. 113—118)

This invention relates to method of making heat exchangers and has for its principal objects the production of simple, efficient, cheap and fluid tight heat exchanger and a simple and rapid method of making them.

According to the present invention the apparatus is made of sheet material united, where necessary, by welding or the like, to avoid the leakage and other difficulties caused by the use of gaskets, etc. By avoiding the use of especially cast or molded parts, the cost of the component parts is reduced to a minimum. By welding the parts together, machining of the adjacent surfaces is avoided. Also being integral it can be put into and out of operation without adjustment of clamping bolts or the like to take care of uneven expansion or contraction.

One suitable form of construction is illustrated by way of example, in the accompanying drawings, wherein.

Figure 1:
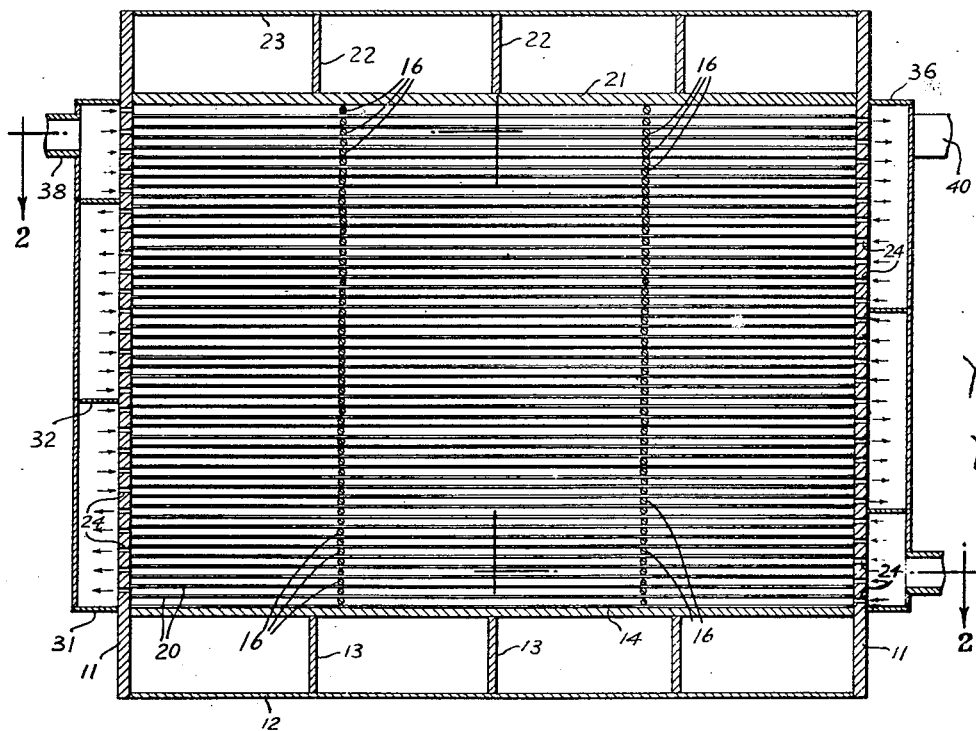
Figure 1 is a vertical section through the apparatus on the line 1—1 of Figure 2.

As shown, the heat exchanger comprises a rectangular box made by welding together four sheets 10 and 11 usually of steel, the back and front sheets to project beyond the two end sheets 11 for a purpose which will be disclosed later.

A bottom 12 is welded at its periphery to the lower margins of the sides 10 and end 11. Across this bottom are three narrow plates 13 welded along their lower edges to the bottom 12 and along their ends to the sides 10. On top of these plates 13 is placed a second bottom 14 which is then welded around its outer edge to the sides 10 and ends 11. This double-bottom is designed to ensure ample resistance to any internal fluid pressure to which the exchanger is apt to be subjected to. Where there is practically no pressure, this double-bottom construction can be omitted. Also other reinforcing means may be used if desired.

On the bottom 14 is laid a grid conveniently formed of a series of metal strips 15 held in spaced relation by two or more cross bars 16; the function of this grid is to provide a circuitous path for the flow of fluid from one corner of the apparatus to the opposite corner. The next step is to lay a thin metal sheet 20 on the top of the grid and weld it all around its periphery to the sides 10 and ends 11 thereafter a series of grids and metal sheets are stacked alternately until the box is nearly full. It will be understood of course, that after each sheet is laid in place it is welded all round to the inner walls of the box like the first sheet. On the last grid is laid a top 21 of thick sheet metal which is then welded in place. Three narrow plates 22 are then welded to the top 21 and sides 10 to prevent the top 21 bulging or buckling. Finally, a second top 23 is welded in place.

These operations without any other steps would result in a series of horizontal, super-imposed compartments each hermetically sealed at all points. Some means must be provided for connecting the compartments to each other in such a way as to enable fluids to be passed through them in counter-current relationship. These connecting means may be either inside or outside the box.

If inside connections are desired, holes may be punched in two of the corners of each of the metal sheets. In one of these holes the lower end of a short piece of tubing is welded with its top projecting upwardly to a slightly greater distance than the thickness of the superimposed grid. After each grid has been laid in place another sheet is superimposed. This second sheet has a hole located so as to register with the top of the tubing attached to the first sheet and also a hole in another corner with the lower end of another short piece of tubing welded thereto. The top of the first piece of tubing is then welded to the second sheet to form a fluid-tight pass from the space below the first sheet to the space above the second sheet. By repeating these operations an apparatus is produced having a series of compartments through which fluids can be passed counter-current.

A simpler method is to provide connections outside the box. This involves making two holes 24 through the ends 11 into each compartment for admission and discharge of fluid. These holes may be cut in the ends 11 before they are welded to the sides 10, or they may be cut, by a torch for example, through the end walls of the completed box.

Figure 2:
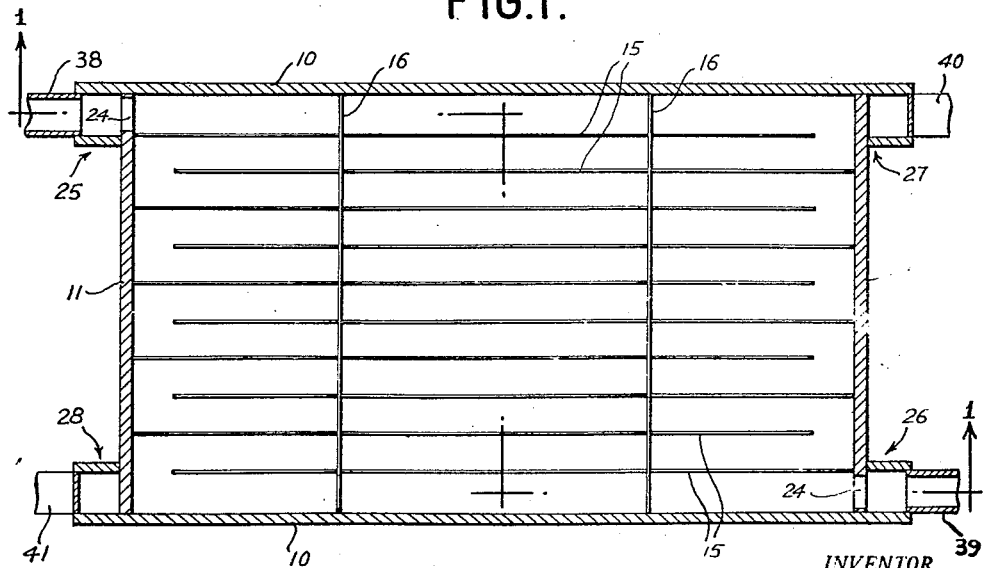
Figure 2 is a horizontal section on the line 2—2 of Figure 1.
Figure 3:
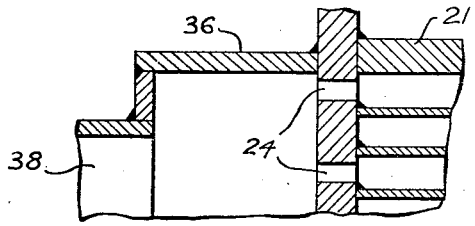
Figure 3 is a detail view on an enlarged scale of the upper left-hand corner of Figure 1.
Figure 4:
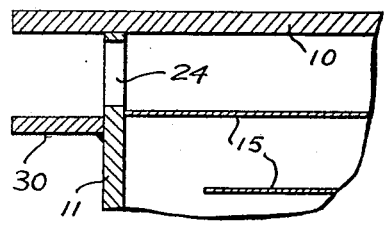
Figure 4 is a detail view on an enlarged scale of the upper left-hand corner of Figure 2.
Figure 5:
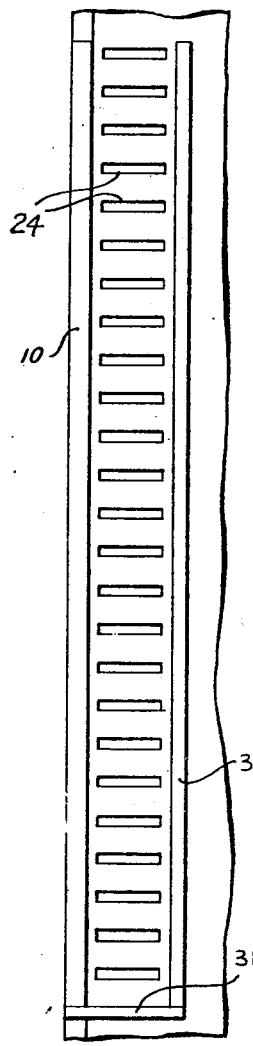
Figures 5, 6, 7 and 8 are detail elevational views showing the method of building up the headers by which fluid is carried from one set of compartments to another.
Figure 6:
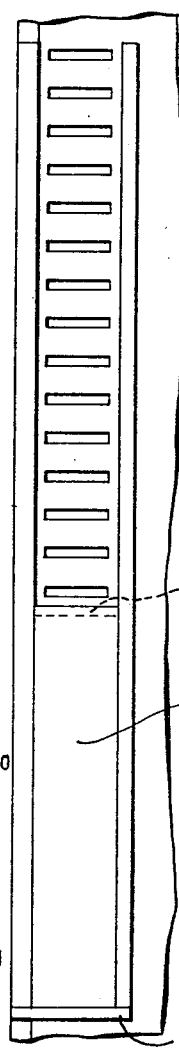
Figure 7:
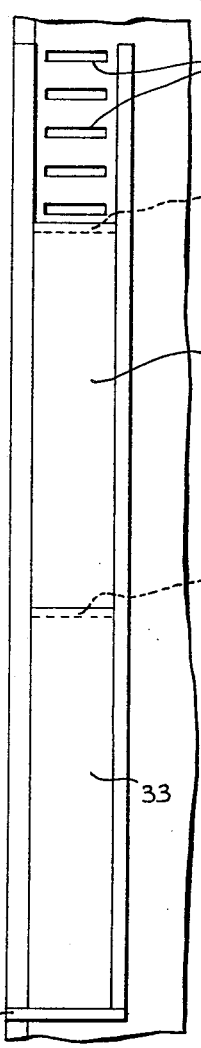
Figure 8:
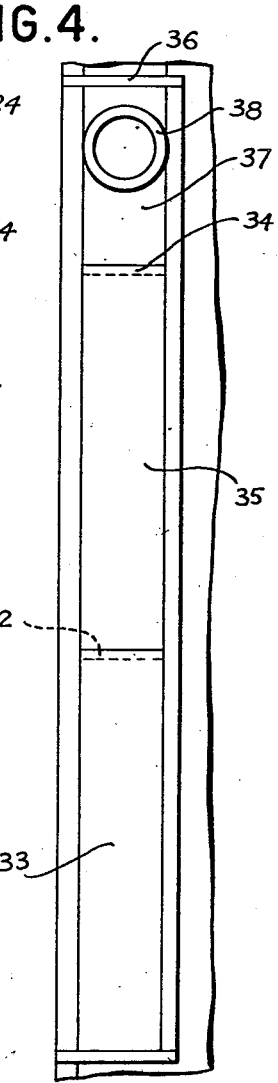

However and whenever these holes 24 are made, they are staggered, so that for one compartment they are in the N. W. and S. E. corners as shown in Figure 2 and in the compartment below they are in the N. E. and S. W. corners.

Various means may be employed for connecting one compartment or one set of compartments to the next. One convenient mode of doing this is to build a header over each vertical row of holes with suitable partitions therein to prevent by-passing of the compartments.

As shown, there are four headers, 25, 26, 27 and 28, one at each corner of the apparatus. The headers 25 and 26 are for the fluid to be heated and 27 and 28 for the hot fluid to be cooled.

The mode of forming one of these headers, viz: 25, is illustrated in Figures 5 to 8, inclusive. The first step is to weld a strip 30 to the end plate 11 then a bottom piece 31 and a partition 32 are welded in place. Next a vertical cover strip is welded to the projecting margin of the side plate 10 and to the parts 30, 31 and 32. Another partition 34 is welded in place and then another cover strip 35. Next a top 36 and third cover strip 37 are welded in position. Finally, a hole is drilled or cut in the top cover plate 37 for a pipe 38, which is welded in place.

It will be noted that alternate compartments are connected in series-parallel, five compartments to each set. This number five is, of course, purely arbitrary and either more or fewer compartments could be connected in parallel. As shown, the water or other cooling fluid from pipe 39 enters the lower set of five, flows across the apparatus to the diagonally opposite header and then passes back through the next set of five and so on. The fluid to be cooled enters the top header 27 through pipe 40 and after passing back and forth through the apparatus is discharged from the bottom of header 28 through pipe 41.

What I claim is:

1. The method of making heat exchangers comprising welding together five plates to form an open-topped rectangular box, placing a flow-controlling grid on the bottom of the box, placing a thin metal plate on top of the grid and welding its periphery to the inner side of the walls of the box to form a fluid-tight compartment therebelow, repeating the procedure of placing a thin metal plate on tops of grids and welding them to the inner side of the walls of the box to form a fluid-tight compartment therebelow until the box is filled and welding on a top.

2. The method of making heat exchangers comprising welding together five plates to form an open-topped rectangular box, placing a flow-controlling grid on the bottom of the box, placing a metal plate on top of the grid and welding its periphery to the inner side of the walls of the box to form a fluid-tight compartment therebelow, repeating the procedure of placing a thin metal plate on tops of grids and welding them to the inner side of the walls of the box to form a fluid-tight compartment therebelow until the box is filled, welding on a top, forming pairs of apertures through the sides of the box into each compartment to permit fluid to be introduced into and discharged from said compartment and attaching headers to the outside of the box connecting said apertures to each other permitting counter-current flow of hot and cold fluids through said compartments.

ARTHUR VIVIAN WETHERBY-WILLIAMS.